(12) United States Patent
Pleszinger (10) Patent No.: US 11,931,668 B2
(45) Date of Patent: Mar. 19, 2024

(54) MEASURING SYSTEM FOR HORSE RACE OR TRAINING

(71) Applicant: Swiss Timing Ltd, Corgemont (CH)

(72) Inventor: Sven Pleszinger, Zwenkau (DE)

(73) Assignee: Swiss Timing Ltd, Corgemont (CH)

(*) Notice: Subject to any disclaimer, the term of this patent is extended or adjusted under 35 U.S.C. 154(b) by 1107 days.

(21) Appl. No.: 16/738,118

(22) Filed: Jan. 9, 2020

(65) Prior Publication Data

US 2020/0292710 A1    Sep. 17, 2020

(30) Foreign Application Priority Data

Mar. 13, 2019 (EP) .................................... 19162545

(51) Int. Cl.
| | |
|---|---|
| A63K 3/00 | (2006.01) |
| G07C 1/10 | (2006.01) |
| G07C 1/24 | (2006.01) |
| H04W 4/38 | (2018.01) |

(52) U.S. Cl.
CPC .................. *A63K 3/00* (2013.01); *G07C 1/10* (2013.01); *G07C 1/24* (2013.01); *H04W 4/38* (2018.02); *A63B 2220/89* (2013.01)

(58) Field of Classification Search
CPC .. A63K 3/00; H04W 4/38; G07C 1/10; G07C 1/24; A63B 2220/89
USPC .................................................... 340/539.13
See application file for complete search history.

(56) References Cited

U.S. PATENT DOCUMENTS

| | | | | |
|---|---|---|---|---|
| 4,261,293 | A * | 4/1981 | Djernes ..................... | B68B 1/10 119/422 |
| 6,032,299 | A * | 3/2000 | Welsh ................... | A41D 13/018 2/467 |
| 6,128,501 | A * | 10/2000 | Ffoulkes-Jones ....... | G01S 19/04 701/472 |
| 6,504,483 | B1 * | 1/2003 | Richards .............. | H04B 1/7163 340/573.3 |
| 6,715,425 | B1 * | 4/2004 | Dore ....................... | B61B 13/04 463/58 |
| 2003/0016135 | A1 * | 1/2003 | Dowd ..................... | A63K 3/00 340/8.1 |

(Continued)

FOREIGN PATENT DOCUMENTS

| | | |
|---|---|---|
| GB | 2 452 538 A | 3/2009 |
| GB | 2520806 A | 6/2015 |

(Continued)

OTHER PUBLICATIONS

European Search Report dated Aug. 16, 2019 in European Application 19162545.8 filed Mar. 13, 2019, 6 pages (with Written Opinion).

*Primary Examiner* — Kerri L McNally
*Assistant Examiner* — Thang D Tran
(74) *Attorney, Agent, or Firm* — Oblon, McClelland, Maier & Neustadt, L.L.P.

(57) ABSTRACT

A measuring system for horse races or training. The measuring system including at least one base station on a horse track or around the horse track, and at least one transponder module placed on at least one movable object, which is composed by a jockey and a horse of the jockey, in order to establish a wireless communication with the base station(s). The transponder module is placed on the body of the jockey, and preferably at the back of the jockey or a visible up-part of the horse.

6 Claims, 6 Drawing Sheets

(56) References Cited

U.S. PATENT DOCUMENTS

| | | | |
|---|---|---|---|
| 2003/0151554 A1* | 8/2003 | McCarthy | G01S 5/14 342/450 |
| 2004/0104845 A1* | 6/2004 | McCarthy | G01S 5/0247 342/463 |
| 2006/0173367 A1* | 8/2006 | Stuart | A61B 5/416 600/508 |
| 2007/0100577 A1* | 5/2007 | Vincenzini | A63K 3/00 702/150 |
| 2008/0036587 A1* | 2/2008 | Meinzen | G01S 19/19 342/357.41 |
| 2008/0042849 A1* | 2/2008 | Saito | G06K 19/07749 604/272 |
| 2008/0216219 A1* | 9/2008 | Desnoyers | A41D 13/0153 2/92 |
| 2010/0172450 A1* | 7/2010 | Komaili | H04L 27/3809 375/345 |
| 2010/0311384 A1* | 12/2010 | Brayton | G08B 27/001 455/404.1 |
| 2013/0280683 A1* | 10/2013 | Smith | G09B 5/00 434/247 |
| 2014/0111352 A1* | 4/2014 | Doherty | G06T 11/206 340/870.01 |
| 2014/0204206 A1* | 7/2014 | Itoi | H04N 7/188 348/143 |
| 2015/0181189 A1* | 6/2015 | Richard | H04N 25/135 348/336 |
| 2015/0289619 A1* | 10/2015 | Cogan | A45C 3/004 190/109 |
| 2015/0326262 A1* | 11/2015 | Linden | A41D 27/207 455/90.1 |
| 2016/0030821 A1 | 2/2016 | Smith et al. | |
| 2018/0116316 A1* | 5/2018 | Raymond | A45F 5/022 |
| 2018/0122205 A1* | 5/2018 | Mujeeb | G08B 5/006 |
| 2018/0136307 A1* | 5/2018 | Turner | G01S 5/0294 |
| 2018/0169857 A1* | 6/2018 | Henning | G06N 20/00 |
| 2019/0051128 A1* | 2/2019 | Yamashiro | G07C 9/257 |
| 2019/0159428 A1* | 5/2019 | Bolen | A01K 11/008 |
| 2019/0201773 A1* | 7/2019 | Titen | A63B 71/0622 |
| 2019/0354735 A1* | 11/2019 | Madhusudhana | G06V 10/255 |

FOREIGN PATENT DOCUMENTS

| | | |
|---|---|---|
| WO | WO 2004/084624 A1 | 10/2004 |
| WO | WO 2017/160155 A1 | 9/2017 |

\* cited by examiner

MEASURING SYSTEM FOR HORSE RACE OR TRAINING

CROSS-REFERENCE TO RELATED APPLICATION

This application claims priority to European Patent Application No. 19162545.8 filed on Mar. 13, 2019, the entire disclosure of which is hereby incorporated herein by reference.

TECHNICAL FIELD

The invention relates to a measuring system for horse racing or training, which includes galloping and trotting. The measuring system includes at least one base station to wireless communicate with a transponder module placed on a movable object, which can be a jockey/driver and/or a horse.

BACKGROUND OF THE INVENTION

In horse racings and training, two basic systems are currently used worldwide. On the one hand, the GPS based system and on the other hand the local positioning system. Both systems have advantages and disadvantages. Which of the two systems is used depends on various external factors and the specific requirements of the customer. Below, both are described fundamentally.

Figure 1:
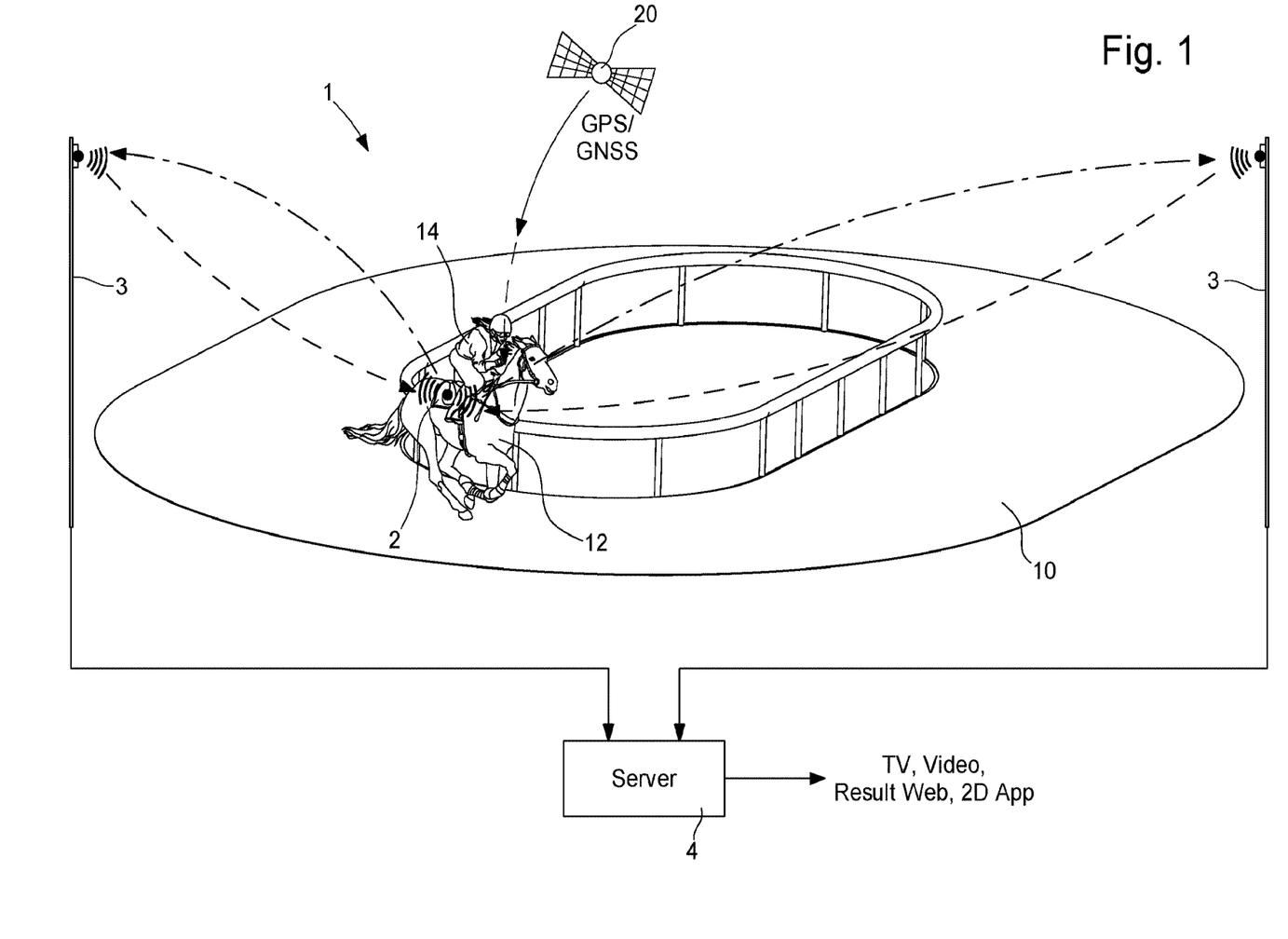
FIG. 1 schematically shows a Local Tracking System for horse races or training according to the prior art, FIG. 2 schematically shows a Local Positioning System for horse races or training according to the prior art.

As shown in FIG. 1, the local tracking system 1 (LTS) is an enhancement of the regular satellite-based positioning technology, known as GPS/GNSS tracking. By the time GPS/GNSS signals of satellites 20 reach the transponder module 2 defined TAG placed on the horse 12. Different sources contribute inaccuracies, e.g. layers of the atmosphere. LTS corrects such variable errors through a permanently installed RTK base station 3, which is a Real-Time Kinematics communication unit 3, which can be connected by cable or WiFi connection to a server 4. The server 4 transmits measured data to TV, Video, Apps, Result Websites or any other presenting applications. In knowing the exact position of the RTK base station 3, differences to the satellite data can instantly be calculated. Resulting correction data are emitted continuously to the transponder module 2. Hence positions and rankings of horses 12 can be determined in real-time at centimetre accuracy.

In addition to the RTK base station 3, up to two RTK transceivers extent the coverage along the race and training track 10. The real-time transmission of the correction data to the mobile transponder modules 2 is done using radio technology such as WIFI or other wireless transmission. Each transponder module 2 transmits the corrected satellite-based position with 5 Hz via radio to the central server 4 for the transcription of the information as shown in FIG. 1.

Another option for the real-time transmission of the corrected satellite-based position to the central server 4 refers to usage of public telecommunication networks e.g. 3G or 4G.

LTS involves the installation of an RTK base station 3, which provides correction data to the transponder modules 2 just because the position of the antenna is exactly known. This adds the ingredient to better the natural inaccuracy of GPS/GNSS to an acceptable, in best case centimetre level. To take advantage of the RTK mode, the transponder module 2 has to reach a so-called RTK fix or RTK float status. Otherwise, the system falls back to GNSS respectively DGNSS inaccuracy.

The permanent movement such as up and down of the saddle cloths, which is one option to attach the transponder module 2 to the horse 12, affects the stability of the transponder module 2 and therefore handicaps the reaching of the RTK status.

Figures 2, 3:
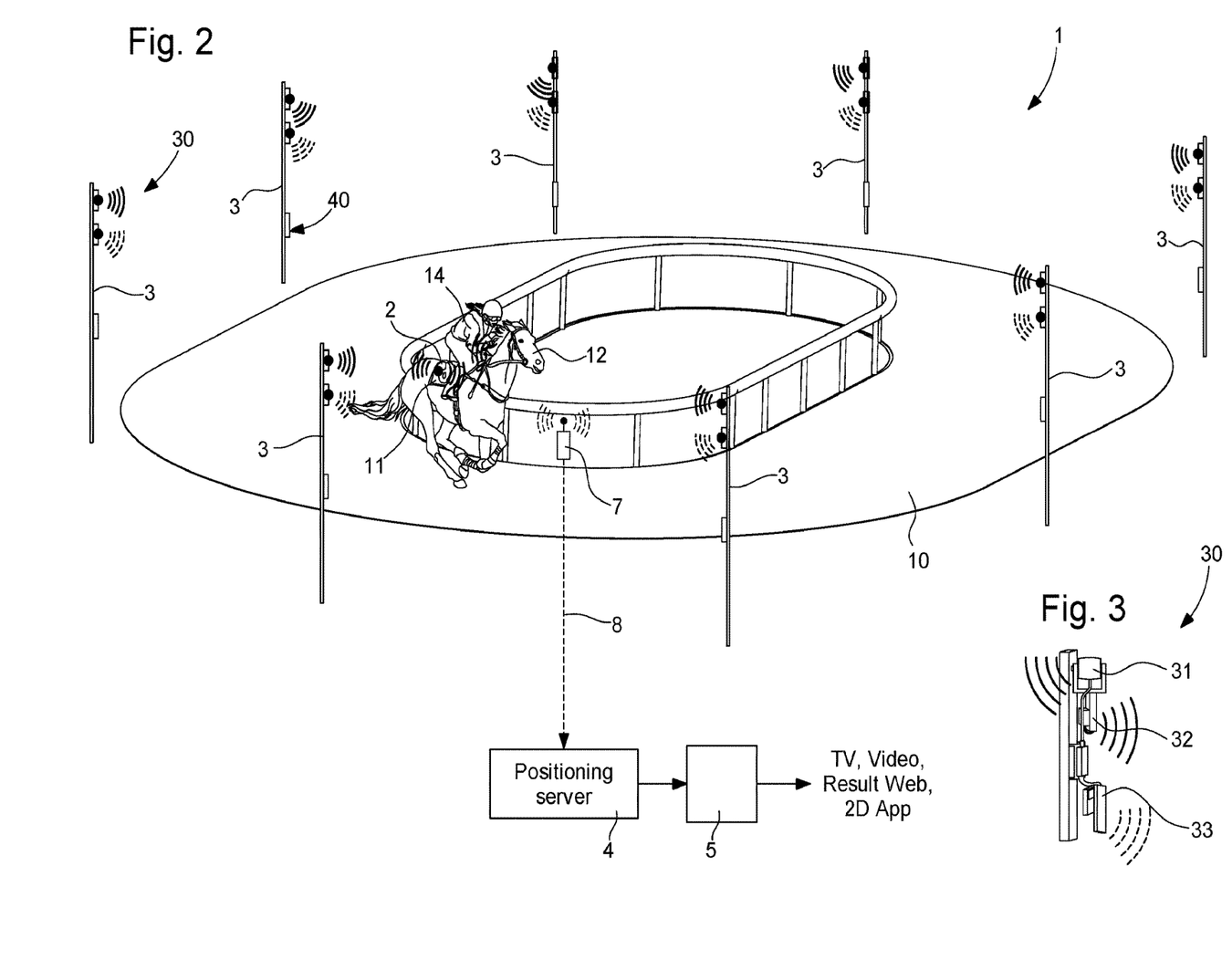

As shown in FIG. 2, a Local Positioning System 1 (LPS) is an advanced solution for precise three-dimensional position tracking in real time. In contrast to GPS, the system allows tracking of persons and objects almost down to the last centimetre and at a considerable higher measuring rate than the satellite-based GPS offers. The system's stationary hardware components are set up locally around the measuring zone 10 (e.g. race course or training track). Different base stations 3 are regular placed around the race track 10, each having an antenna arrangement 30 to communicate with a transponder module 2 in operation. As shown in FIG. 3, said antenna arrangement 30 can include a first LPS antenna 31, a second LPS antenna 32 and a WiFi antenna 33. In order to use one LPS at least partially at multiple venues each base station 3 can carry a portable part 40 shown in FIG. 2. An access point 7 receives information signals from the base stations 3 to communicate by cable 8 (network or fiber optical) to a positioning server 4. Said server 4 is linked to a tracking center operator 5 who transmits measured data to TV or other applications.

A number of lightweight, portable transponder modules 2 serve as the tracking targets for the system 1. Position data are transmitted wirelessly to at least one base station 3 and from there to the application server 4, which determines the current 3D position and derives precise speed and acceleration values for each portable transponder module 2. Client applications can make use of these processed data in real-time. The choice of the target application platform and intended usage of these data is up to the client: Training and performance analyses including optional heart rate information, virtual game replays, statistics or broadcast graphics—nearly everything you can imagine is possible with LPS. The covered range is about 1 km radius, which makes this system unique for sports with a huge field of action and high precision.

Figure 4:
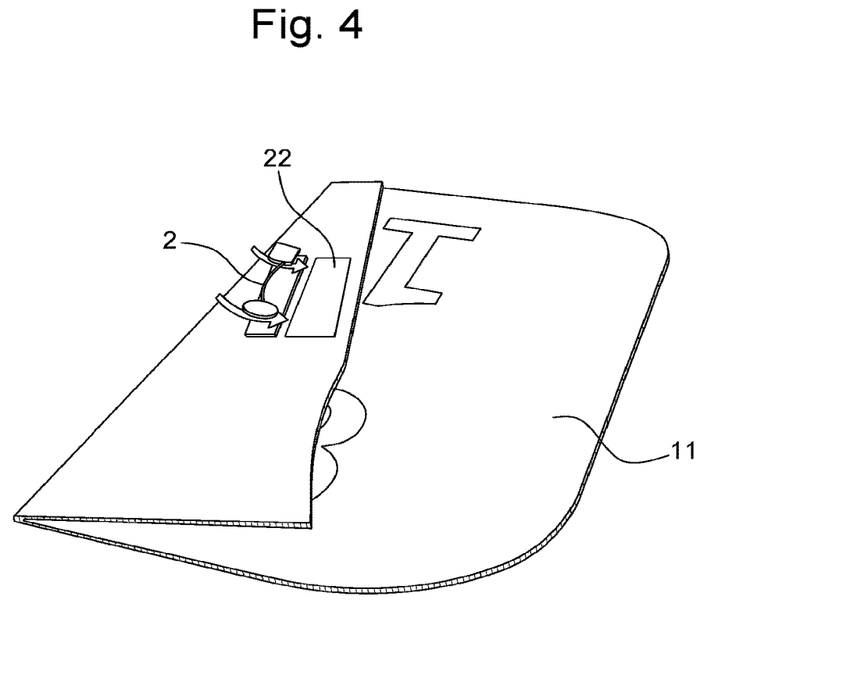
FIG. 4 shows a saddle cloth with a transponder module to be mounted on a horse for a measuring system according to the prior art, FIG. 5 schematically shows a jockey onto a horse with the position of a transponder module in a saddle cloth for a measuring system according to the prior art, FIG. 6 schematically shows a measuring system with a transponder module carried on the jockey for horse races or training according to the invention.

Regardless of the system to be used, the transponder module 2 is currently placed in the saddle cloth 11 of the horses 12 about half an hour before each race/training, in pockets 22 provided for this purpose, as shown in FIG. 4. Either the transponder modules 2 remain in this saddle cloth 11 for the whole day or the transponder modules 2 are removed after the race/training and being placed into another set of saddle cloths 11 for the next race/training.

Due to their size, the saddle cloth 11 can grind on the floor. A person carrying or walking behind can easily step on it and damage the sensitive transponder module 2. Hence the transponder module 2 might no longer be functional.

Figure 5:
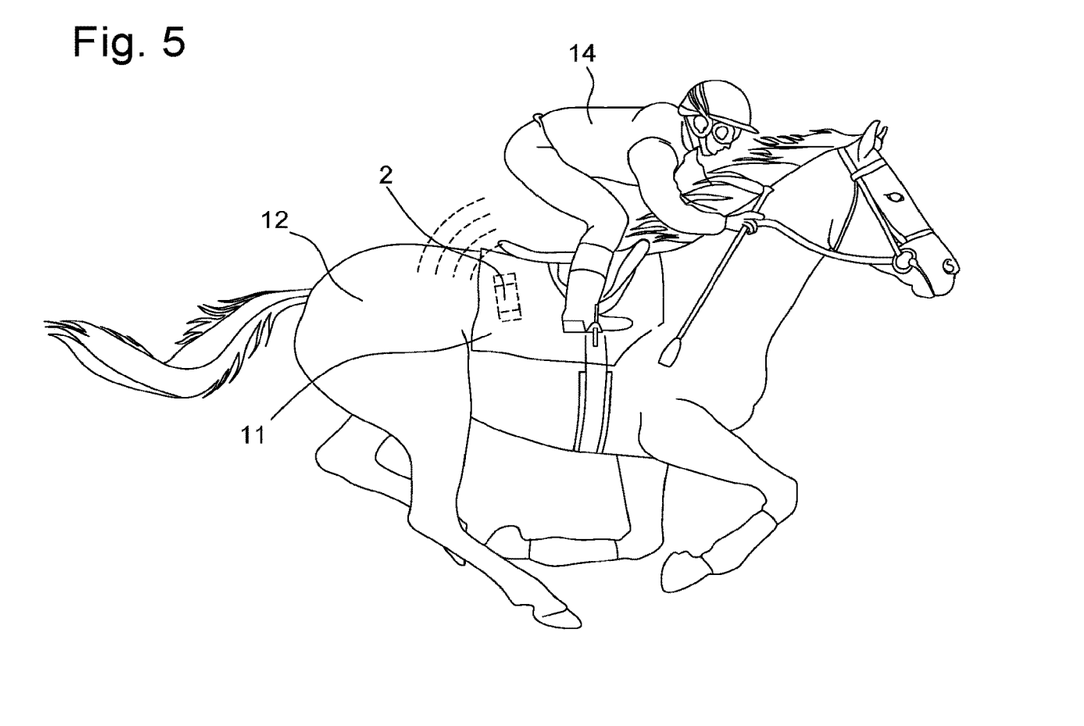

Performance issues going along with the placement of the transponder module 2 in the saddle cloth 11 result from the bodies of the jockey 14 and the horse 12. The pure coverage through the bodies significantly interfere with the reception and transmission of data as shown in FIG. 5. Parts of the satellites or the permanently installed base stations or antennas do not have a direct view to the transponder modules 2 due to the bodies. This results in considerable less accurate data.

Another relevant problem limiting the accuracy of a system dedicated to the placement of the transponder modules 2 in the saddle cloths 11 is the constant vibration and fluttering the transponder modules 2 encounter. While the horse 12 is trotting or galloping, the saddle cloth 11 permanently and frequently moves up and down as well as back and forth and so the transponder module 2.

Thus, the transponder module 2 strikes uninterruptedly on the back of the horse 12. This impact on the transponder module 2 causes massive irritations and malfunction, especially with the GPS/GNNSS/RTK system 1. The internal time generator (quartz/silica) loses the rhythm essential to calculate an accurate position. As a consequence, the GPS transponder module 2 falls back from the RTK fix (highest accuracy) to the RTK float or even the GNSS (lowest accuracy) and therefore provides inaccurate position data. If this happens to a GPS transponder module 2 in the race, wrong data, positions, rankings, distances etc. will be displayed on the TV and other media.

SUMMARY OF THE INVENTION

It is an object of the present invention to provide a measuring system for a horse race or training with an adapted arrangement of the transponder module to improve the transmission of accurate data signals and, in particular for determining an accurate position of the horse during races or training.

According to the invention, there is provided a measuring system for a horse race or training as recited in claim 1.

Other aspects of the invention are recited in the dependent claims attached hereto.

One advantage of the measuring system for a horse race or training lies in the fact that each transponder module is placed on the body of the jockey/driver or on a visible up-part of the horse in order to avoid any interferences or obstacles during the horse race or training for determining in particular the accurate position of the horse. So the transponder module can easily receive position information from visible satellites and easily communicate measurement data signals with at least one base station.

Advantageously, the transponder module can be placed at the back of the jockey or driver, and preferably fixely placed in a pocket of a security vest, which is much better protected from accidental damages as experienced with the saddle cloths of the prior art.

Advantageously, the transponder module can be also placed on an helmet of the jockey/driver or at the shoulder of the jockey/driver or at the arm of the jockey/driver or at the thigh or leg of the jockey/driver. It can be envisaged to place the transponder module on a bridle or a head of the horse.

BRIEF DESCRIPTION OF THE DRAWINGS

Other features and advantages of the measuring system for horse races or training will appear more clearly in the following description of non-limiting embodiments, with reference to the appended drawings, in which:

FIG. 3 shows an antenna arrangement on each base station of the system of FIG. 2 according to the prior art.

DETAILED DESCRIPTION

In the following description, all the components of a measuring system for horse races or training, that are well known to those skilled in the art in this technical field will be described only in a simplified manner. A transponder module used in said system, has to be considered as a device for transmitting or receiving wirelessly any data or control signals, such as a transceiver, with one or several close or remote instruments and for communicating position data of the horse or the jockey races or training.

Figure 6:
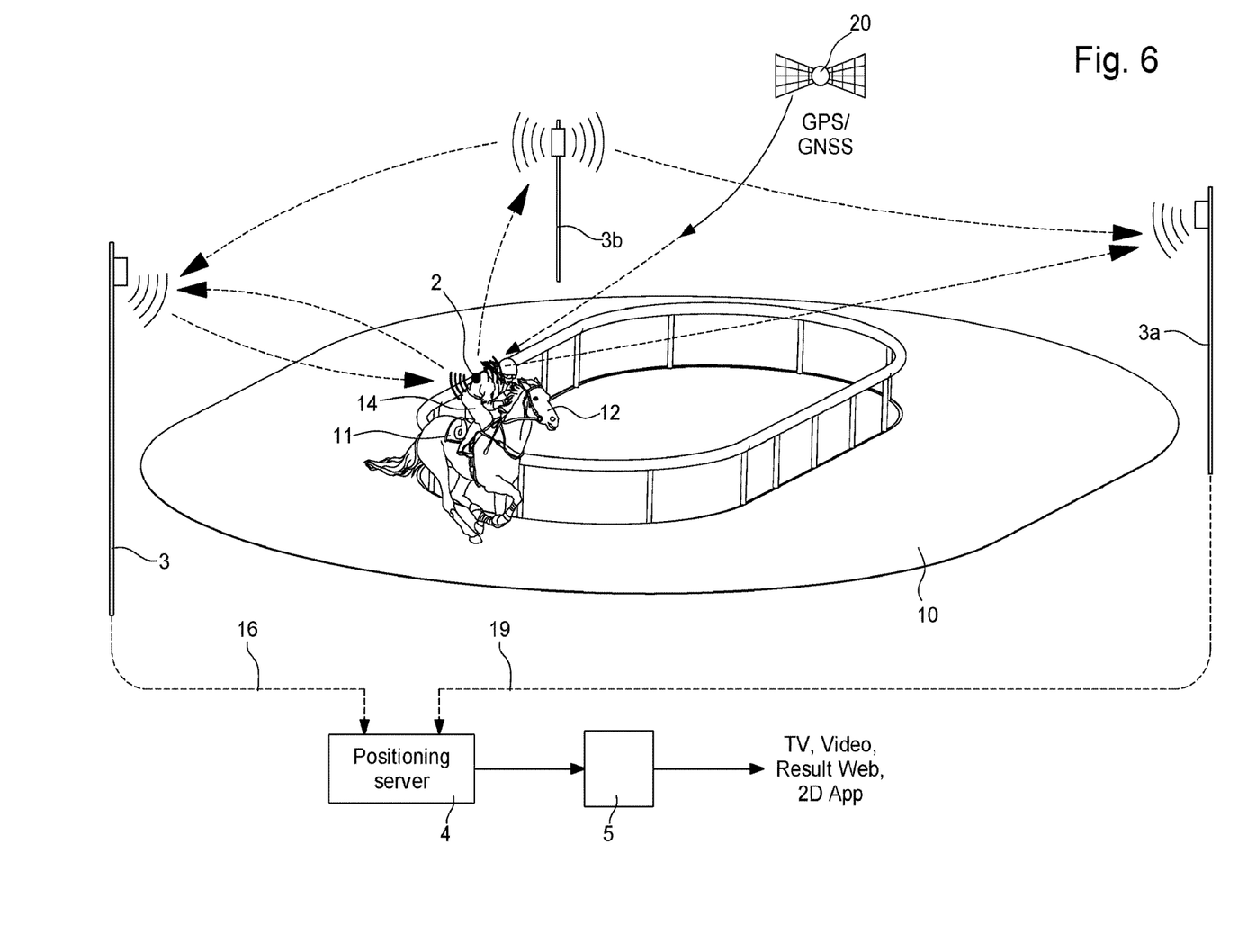

FIG. 6 represents a measuring system 1 for horse races or training, that is mainly composed of at least one base station 3 placed on a race track 10 or around the race track 10 to communicate wirelessly with at least one transponder module 2 mounted on one free visible up-part of a horse 12 or preferably on a body of a jockey 14 for a race or for a training. Normally it can be used for example a Local Positioning System (LPS) for precise three-dimensional position tracking in real time as shown in FIG. 2 abovementioned or a Local Tracking System (LTS), which is an enhancement of the regular satellite-based positioning technology, known as GPS/GNSS tracking as shown in FIG. 1. In the case of LTS system, a reception of GPS signals from visible satellites 20 around the Earth can be picked-up by each transponder module 2 in operation for horse races or training in order to determine a position on the track 10.

As shown in FIG. 6 according to one embodiment, the measuring system 1 further includes an RTK master base station 3 placed in periphery of the race track 10, a transceiver base station 3a on a determined position in periphery of the race track 10 distant from the master base station 3, and, if required, another transceiver base station 3b on a determined position in periphery of the race track 10 distant from the other transceiver base stations 3, 3a. The RTK base station 3 is connected by cable 16 or WiFi connection to a server 4. At least one transceiver base station 3a is connected by cable 19 or WiFi connection to the server 4. The positioning server 4 (LPS) is linked to transmit data according to a UDP protocol to a tracking center operator 5. Said tracking center operator 5 can communicate position measurement data to TV, Video, Result Web or 2D App or other applications.

In this embodiment, the transponder module 2 is disposed on the back of the jockey 14. Said transponder module 2 in operation can receive also GPS signals from visible satellites 20 to determine the exact position of the transponder module 2 to be communicated to the base stations 3, 3a, 3b during races or training. It is possible also that a position determination is performed inside the transponder module 2, before being communicated to base stations. The RTK base station 3 can transmit correction data to the transponder module 2, which generally includes a signal receptor, a signal emitter, a microcontroller, a memory and normally a battery for a power supply of each electronic component of said transponder module 2.

In the prior art, each transponder module 2 is placed on the saddle cloth 11, which is not an optimal choice given that it can have some interferences during the reception of signals from different instruments or GPS signals. This reduces the good reception of said signals during the race or training and can generate errors on position measurement during the race or training.

Figure 8:
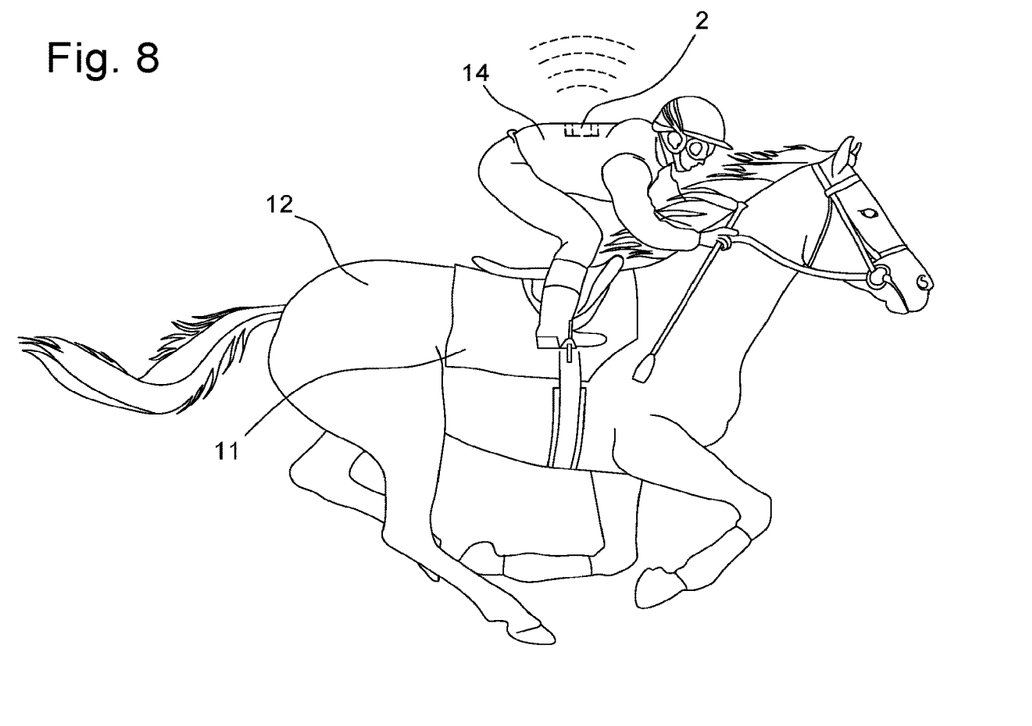
FIG. 8 shows a jockey onto a horse with a security vest on the back of the jockey and a transponder module mounted in the pocket of the vest for a measuring system for horse races or training according to the invention.
Figure 9A:
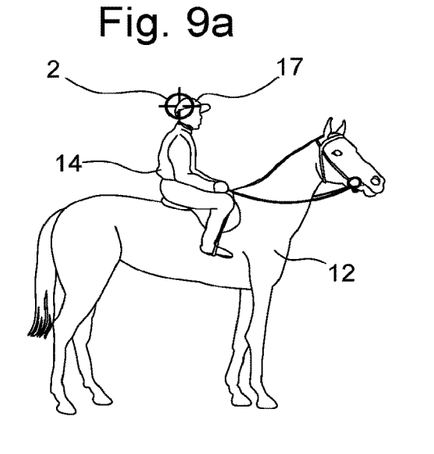
FIGS. 9a to 9e show different positions to place a transponder module on the jockey or on a visible up-part of the horse for a measuring system for horse races or training according to the invention.
Figure 9B:
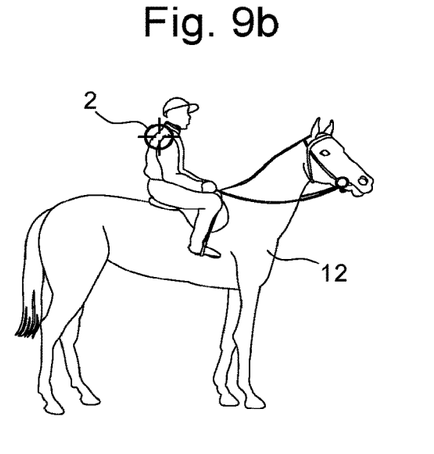
Figure 9C:
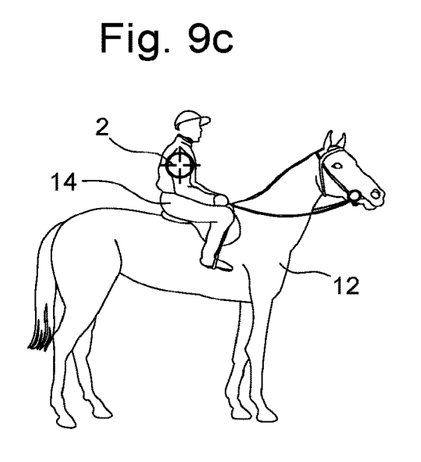
Figure 9D:
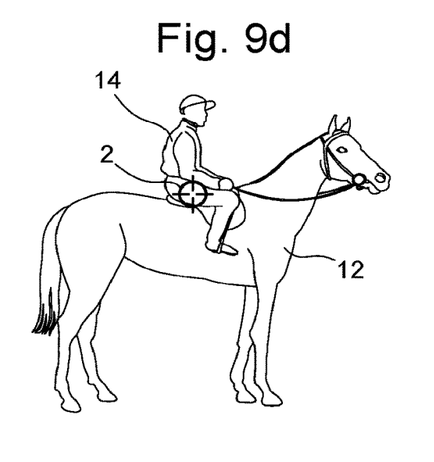

For this invention, this is provided to change the position of the transponder module 2, defined TAG as shown in FIGS. 8, 9a to 9d. Different possible positions of the transponder module 2 on the body of the jockey 14 onto a horse 12 can be mentions below for example:

At the back of the jockey 14 (FIG. 8)
At the helmet 17 of the jockey 14 (FIG. 9a)
At the shoulder of the jockey 14 (FIG. 9b)
At the arm of the jockey 14 (FIG. 9c)
At the thigh of the jockey 14 (FIG. 9d)

Figure 9E:
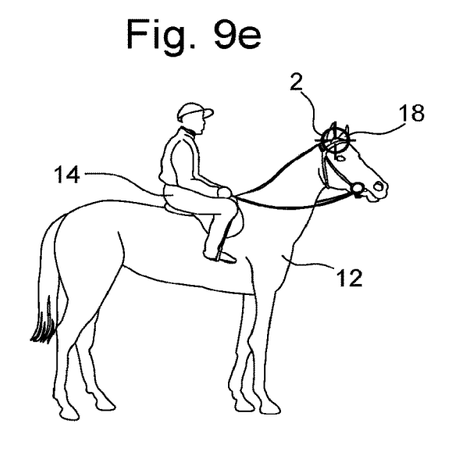

It can be also envisaged to place the transponder module 2 on the bridle 18 or the head of the horse 12, as shown in FIG. 9e for a good reception of GPS signals from visible satellites.

Figure 7:
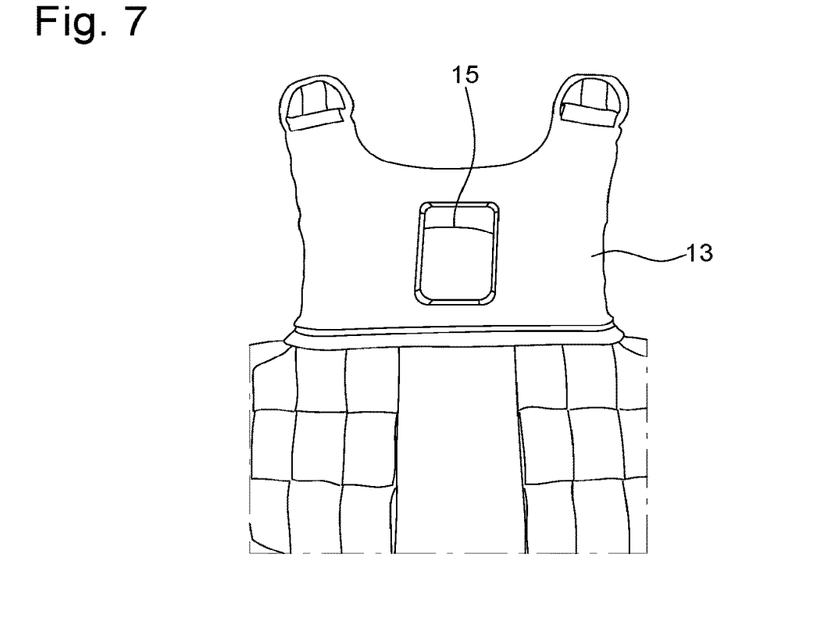
FIG. 7 shows a security vest with a pocket for a transponder module for a measuring system for horse races or training according to the invention.

The currently most meaningful position is seen on the back of the jockey 14. In FIG. 7, a transponder module 2 can be fixely placed in a pocket 15 directly onto the jockey's vest 13, or an extra cover can be pulled over the jockey security vest 13 or attached to the jockey security vest 13 having a fastener such as a Velcro fastener. The transponder module 2 can be placed also in a bag not represented on the back of the jockey 14.

In general, it is an obvious measure for any kind and use of satellite-based navigation/positioning system. Placing the transponder module 2 at a position from where the maximum number of satellites 20 (FIG. 6) can be seen is increasing the chance to get plausible and constantly coordinates. For that reason, the saddle cloths 11 are not an optimal choice. The jockey 14 covers a large area of the hemisphere and as the very top position on the saddle 11 is also not achievable the transponder module 2 is partially also limited in its angle field through the body of the horse 12 with an interference of the jockey 14 on the saddle cloth 11.

In contrast, the back of the jockey 14 offers much better conditions. As more satellites 20 can be included in the calculation as more references are available. This becomes even more important when it is about real-time positioning. Since directions are changed slowly but steady during a race on a circular track 10, there is a limited angle field if transponder module 2 is placed in saddle cloth 11 that also means that the satellites 20 involved in the calculation of the position are changing. It is not the case with the placement on the jockey's back 14.

The difference between saddle cloth 11 and back of the jockey 14 can be quantified in an accuracy varying from 50 cm to several meters for the saddle cloth 11 and 10 cm to 25 cm on the back of the jockey 14.

The jockey 14 balances the movements of the horse 12 with his lower body very well, so that, in contrast to the saddle cloth 11, the upper body remains relatively stable throughout the whole race/training. Hence the impact the transponder module 2 exposed is reduced to a minimum since the transponder module 2 pocket 15 (FIG. 7) is directly attached to the tight-fitting security vest 13 of the jockey 14. So the sensitive clock inside the transponder module 2 receives considerable less, even absorbed shocks lowering the number of failures significantly compared to the placement in the saddle cloth 11.

Another advantage is that the transponder module 2 in the security vest 13 pocket 15 is much better protected from accidental damages as experienced with the saddle cloths. In FIG. 8, stepping on is virtually impossible, because the jockey 14 wears the security vest the majority of the time. Before using the individually assigned transponder module 2 for the first time, the jockeys 14 will be given handling guidelines for the safe placement in and removal from the security vest pocket. Alternatively or in addition the insertion and removal of the transponder module 2 will be performed by trained personnel/staff.

As represented in FIGS. 6 to 9, not just with regards to the tracking accuracy the assignment of the transponder modules 2 to the jockeys 14 offers added value. Saddle cloths 11 are mainly used once per day so that the transponder modules 2 are to be taken off from the saddle cloth 11 after races or workouts. Thus a transponder module 2 is only used once or every second or third race/workout while a jockey 14 can train and race different horses on one day. Hence the number of required transponder modules 2 is much lower if assigned to jockeys 14, presupposed the transponder modules 2 are operated in a way that adapts the activity level of the transponder module 2 (how often positions are calculated and transmitted) to the activity level of the jockey 14 (e.g. resting, workouts, races) so that the battery lifetime of the transponder module 2 covers a working day e.g. 6 hours. So an added value is achieved with regards to reduced handling efforts and a lower number of required transponder modules 2.

Most national regulations prescribe the athlete horses 12 to be identified through an implanted RFID chip. The transponder module 2 described here, pre-assigned to the jockey 14 through application software, optionally involves an RFID reader allowing the users e.g. the jockeys 14 to easily assign the transponder module 2 by hand to the horse 12 they race or train with by holding the transponder module 2 near the RFID. The allocation of the ID of the respective horse 12 to the name of a horse happens in the application software. In case no RFID chip is implanted or the chip cannot be read out the assignment of the jockey transponder module 2 to the trained or raced horse 12 is conducted manually in the application software.

Motion sensors, also called Inertial Measurement Units (IMU), are used to enhance the position measurement by providing parameters for orientations, acceleration or other for analyse purposes. Placing the transponder module 2 on the back of the jockey 14 supports a steady position in favour of a higher accuracy in the position calculation. To the same degree the proposed placement of the transponder module 2 is going along with a stabilization of the IMU sensor implemented in the transponder module 2 so that at least partially the ability to track the enhanced IMU motion parameters of the horse 12 becomes limited. Therefore the system described here optionally considers one or more additional IMU sensors separated from the transponder module 2 and placed on the horse 12 e.g. on the saddle, the girth or any other place from where the movement of the horse 12 can directly be detected having the same time basis as the transponder module 2, such external IMU sensor(s) provides synchronized parameters, unadulterated from the stabilized position of the transponder module 2. For real-time analyses the data from the external IMU sensor(s) are transmitted via Bluetooth to the transponder module 2. Otherwise this data can also be downloaded after the race/training.

In a previous RTK test, first comparative values were recorded. The RTK transponder module 2 was placed on the back of the jockey 14 as shown in FIG. 8. The comparison values for the attachment of the transponder module to the saddle cloth 11 as shown in FIG. 5, come from a test race.

Officially, the ranking is determined by the nose of a horse. The RTK system measures the ranking using the transponder module 2 on the back of the jockey 14. It can be seen two lines in a camera photo-finish positioned at the nose of the horse and at the position of the transponder module 2 on the back of the jockey not represented in said description.

|  | Saddle cloth | Back | Explanatory note |
|---|---|---|---|
| Maximum deviation | 256 ms | 56 ms | |
| Maximum deviation in cm | 410 cm | 90 cm | acceptance of 16 m/s |
| Ø deviation | 68.03 ms | 10.55 ms | |
| Ø deviation in cm | 108.85 cm | 16.88 cm | acceptance of 16 m/s |
| deviation 95% | 98.08 cm | 12.96 cm | Saddle cloth: real v, Back: 16 m/s |
| Correct rankings | 60% | 98% | |

1. "Saddle cloth"=comparison to an adjusted photo finish line pointing at the assumed position of the transponder module at the saddle cloth
2. "Back"=comparison to an adjusted photo finish line pointing at the assumed position of the transponder module at the back of the jockey
3. The "Ø deviation 95%" ignores 5% of the highest values.

The figures clearly show that attaching the transponder module 2 to the back of the jockey 14, there is a significant improvement of the data results. Accordingly, there is an improvement in the accuracy of the recorded values and a marked reduction in erroneous ranking.

From the description that has just been given, several variants of the measuring system can be devised by those skilled in the art without departing from the scope of the invention defined by the claims. Two transponder modules can be mounted on the body of the jockey and preferably at two different positions.

The invention claimed is:

1. A measuring system for a horse race or training, the system comprising:
   at least one base station on a horse track or around the horse track, and
   a transponder module arranged on a jockey, in order to establish a wireless communication with the at least one base station,
   wherein the transponder module is fixedly arranged on a back of a security vest worn on a body of the jockey so as to be arranged on the back of the jockey;
   wherein the transponder module is configured to pick-up signals from satellites and from the at least one base station, communicate data signals to the at least one base station, determine a position of the transponder module on the track, and transmit the determined position to the at least one base station; and
   wherein the at least one base station is configured to transmit correction data signals to the transponder module to correct the position of the transponder module.

2. The measuring system according to claim 1, wherein the transponder module is fixedly placed in a pocket of the security vest.

3. The measuring system according to claim 1, wherein the transponder module is placed in an extra cover pulled over the security vest of the jockey.

4. The measuring system according to claim 1, wherein the transponder module is attached to the security vest having a fastener.

5. The measuring system according to claim 1, wherein the transponder module further comprises at least one motion sensor to determine a position or a speed or an acceleration of a horse ridden by the jockey before a communication to an access point or the at least one base station.

6. The measuring system according to claim 1, wherein the transponder module further comprises an RFID reader configured to read an identifier of a horse from an RFID chip implanted in the horse, and associate, in a memory, the identifier of the horse with an identifier of the transponder module.

* * * * *